(12) United States Patent
Kim et al.

(10) Patent No.: US 11,153,054 B2
(45) Date of Patent: Oct. 19, 2021

(54) USER EQUIPMENT CONFIGURED FOR POWER SAVINGS DURING SRS ANTENNA SWITCHING

(71) Applicant: Intel Corporation, Santa Clara, CA (US)

(72) Inventors: Jiwoo Kim, San Jose, CA (US); Bruce Geren, Chandler, AZ (US); Jie Cui, San Jose, CA (US); Yang Tang, San Jose, CA (US); Tom Harel, Shefayim (IL)

(73) Assignee: Intel Corporation, Santa Clara, CA (US)

( * ) Notice: Subject to any disclaimer, the term of this patent is extended or adjusted under 35 U.S.C. 154(b) by 51 days.

(21) Appl. No.: 16/809,094

(22) Filed: Mar. 4, 2020

(65) Prior Publication Data

US 2020/0204323 A1    Jun. 25, 2020

Related U.S. Application Data

(60) Provisional application No. 62/825,691, filed on Mar. 28, 2019, provisional application No. 62/826,662, filed on Mar. 29, 2019, provisional application No. 62/827,752, filed on Apr. 1, 2019.

(51) Int. Cl.
*H04L 5/00* (2006.01)
*H04W 72/04* (2009.01)

(52) U.S. Cl.
CPC ......... *H04L 5/0051* (2013.01); *H04W 72/042* (2013.01)

(58) Field of Classification Search
CPC .......................... H04L 5/0051; H04W 72/042
See application file for complete search history.

(56) References Cited

U.S. PATENT DOCUMENTS

2014/0112168 A1*  4/2014  Chen .................... H04B 7/0697
2021/0112498 A1*  4/2021  Duan ................ H04W 52/0274

* cited by examiner

*Primary Examiner* — Ronald B Abelson
(74) *Attorney, Agent, or Firm* — Schwegman Lundberg & Woessner, P.A.

(57) ABSTRACT

Embodiments of an apparatus of a user equipment (UE) configured for operation in a fifth-generation system (5GS) are described herein. The UE comprises first and second array antennas for transmission of mmWave signals including a sounding-reference signal (SRS). In response to decoding radio-resource configuration (RRC) signalling that indicates antenna switching for SRS, the UE initiates a countdown timer and transitions the second array antenna from a low-power state to an active state. If a downlink control information (DCI) indicating SRS antenna switching is not received while the countdown timer is active, the UE generates a command to transition the second array antenna to a low-power state upon expiration of the countdown timer.

20 Claims, 4 Drawing Sheets

USER EQUIPMENT CONFIGURED FOR POWER SAVINGS DURING SRS ANTENNA SWITCHING

PRIORITY CLAIM

This application claims priority to U.S. Provisional Patent Application Ser. No. 62/825,691 filed Mar. 28, 2019 [reference number AC0627-Z (1884.A03PRV)], U.S. Provisional Patent Application Ser. No. 62/826,662 filed Mar. 29, 2019 [reference number AC0830-Z (1884.A04PRV)], and U.S. Provisional Patent Application Ser. No. 62/827,752, filed Apr. 1, 2019 [reference number AC0830-Z (1884.A05PRV)] which are each incorporated herein by reference in their entireties.

TECHNICAL FIELD

Embodiments pertain to wireless communications, and particularly to communications within Fifth Generation (5G) New Radio (NR) systems and networks. Some embodiments pertain to transmission of sounding reference signals (SRS) by user equipment (UE).

BACKGROUND

One issue with antenna switching is that a user equipment (UE) needs to prepare its second array antenna to be active while it waits for a downlink control information (DCI) from network for SRS transmission. However, if there is no DCI from the network or if the DCI is not received in a reasonable amount of time, the UE wastes excessive battery power keeping the second array antenna active.

DETAILED DESCRIPTION

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

Figure 1:
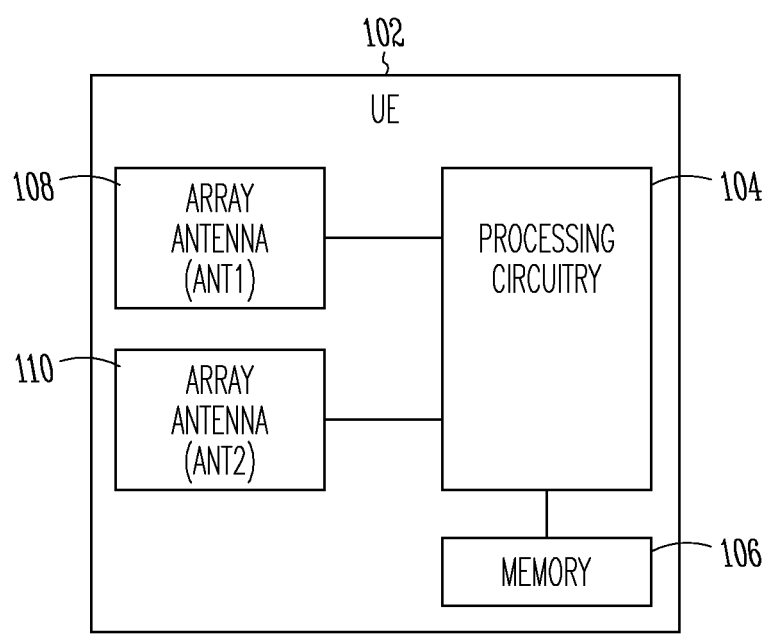
FIG. 1 is a functional diagram of a UE in accordance with some embodiments.

FIG. 1 is a functional diagram of a user equipment (UE) in accordance with some embodiments. UE 102 may comprise processing circuitry 104 and memory 106 coupled to the processing circuitry 104. UE 102 may also include a first array antenna 108 (ANT1) and a second array antenna 110 (ANT2) coupled to the processing circuitry. In accordance with embodiments, the first and second array antennas may be configured for transmission of mmWave signals (FR2) including a sounding-reference signal (SRS). UE 102 may initiate an antenna switching procedure for SRS in response to decoding radio-resource configuration (RRC) from a next-generation Node B (gNB). A downlink control information (DCI) from the gNB indicating SRS antenna switching may trigger transmission of an SRS by the first array antenna 108 and then an SRS by the second array antenna 110. In some embodiments, the processing circuitry 104 may comprise a baseband processor, and the UE 102 may further comprise a countdown timer. These embodiments are described in more detail below.

Figure 2A:
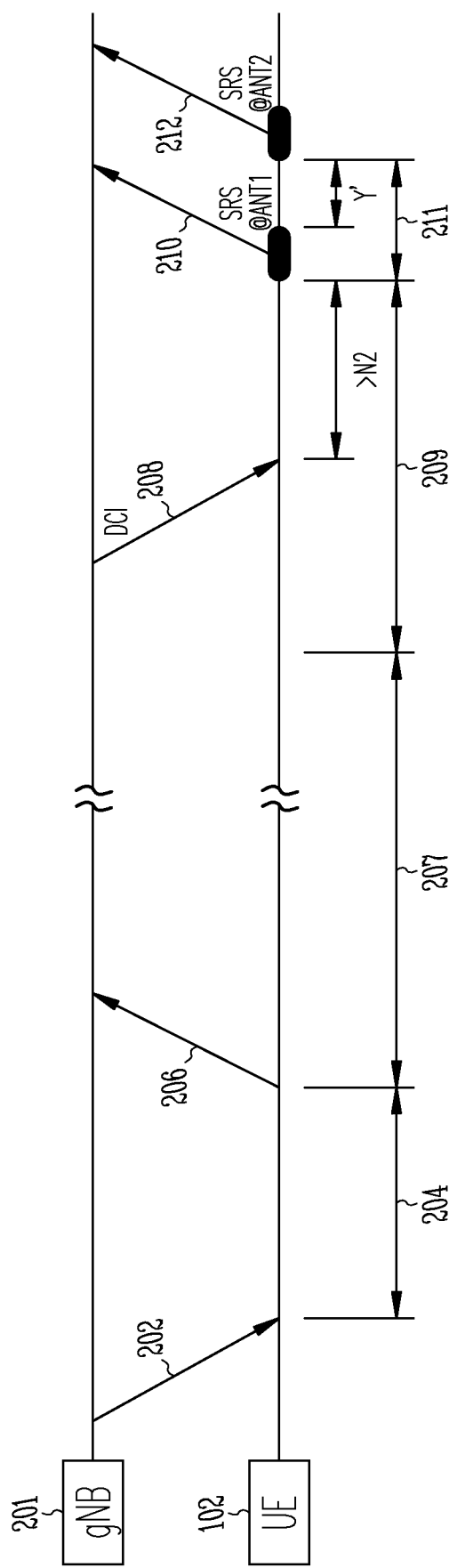
FIG. 2A illustrates an SRS antenna switching procedure in accordance with some embodiments.

FIG. 2A illustrates an SRS antenna switching procedure in accordance with some embodiments in which the DCI for antenna switching is received after expiration of a timer window for SRS antenna switching.

Figure 2B:
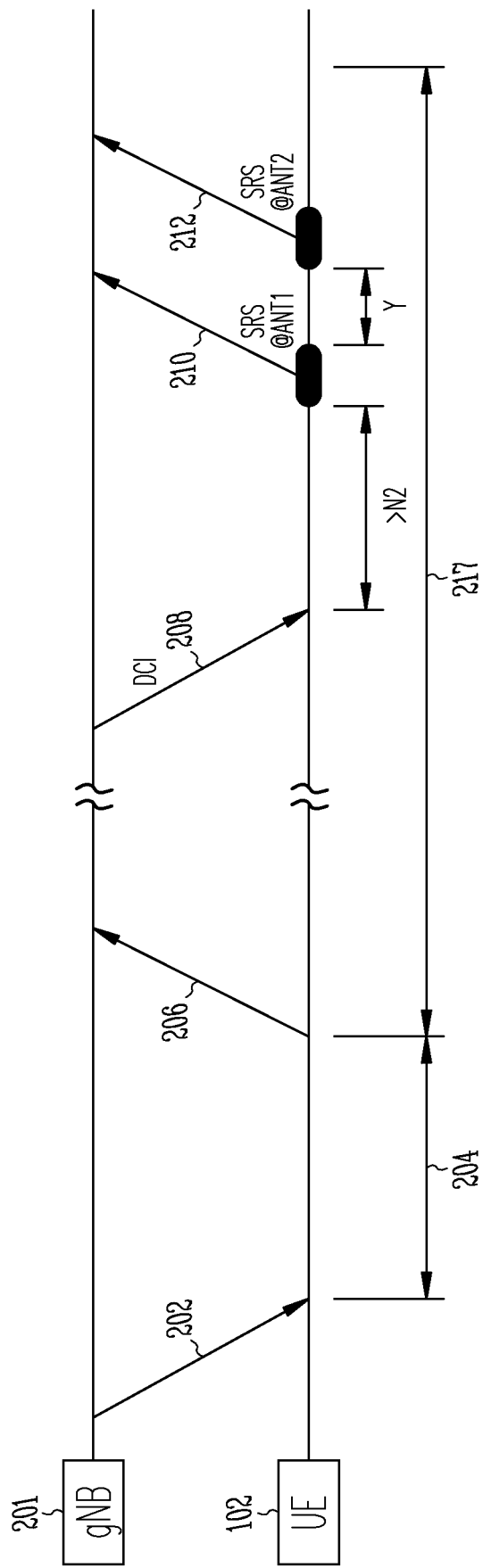
FIG. 2B illustrates an SRS antenna switching procedure in accordance with some other embodiments.

FIG. 2B illustrates an SRS antenna switching procedure in accordance with some other embodiments in which the DCI for antenna switching is received before expiration of the timer window for SRS antenna switching.

As illustrated in FIG. 2A, the UE 102 may decode RRC signalling 202 that indicates antenna switching for SRS. After RRC processing delay 204, the UE 102 may initiate a countdown timer and transition its second array antenna 110 from a low-power state to an active state. The UE 102 may also receive DCI 208 indicating SRS antenna switching. In these embodiments illustrated in FIG. 2A, if the DCI 208 is not received while the countdown timer is active (during timer window 207), the UE 102 may transition the second array antenna 110 to a low-power state upon expiration of the countdown timer and the second array antenna may be in a low-power mode during time 209.

In these embodiments, if the DCI 208 is received after expiration of the countdown timer (see FIG. 2A), the UE 102 may generate a command to transition the second array antenna 110 from the low-power state to the active state and configure the UE 102 for transmission of the SRS 212 by the second array antenna 110 once the second array antenna 110 reaches the active state. FIG. 2A illustrates ramp-up time 211 for the second array antenna 110 reaches (ramps up to) the active state before transmission of the SRS 212.

In the embodiments illustrated in FIG. 2B, if the DCI 208 is received while the countdown timer is active (has not expired) (i.e., during timer window 217), the UE 102 is configured for transmission of the SRS by the second array antenna 110 and the countdown timer may be reset.

Although timer window 207 (FIG. 2A) is shown as being shorter than timer window 217 (FIG. 2B), this is for illustrative purposes to illustrate that DCI 208 in FIG. 2A is received after timer window 207 expires, while DCI 208 in FIG. 2B is received within timer window 217 (i.e., before the timer window expires). In some of these embodiments, timer windows 217 and 207 may be same length.

In these embodiments, in response to decoding the DCI 208, the processing circuitry 104 may configure the UE 102 for transmission of the SRS 210 by the first array antenna 108, perform antenna switching to switch from the first array antenna 108 to the second array antenna 110, and configure the UE 102 for transmission of the SRS 212 by the second array antenna 110 after transmission of the SRS 210 by the first array antenna 108.

In these embodiments, when the UE 102 decodes a DCI 208 that indicates SRS antenna switching, UE 102 first transmits an SRS by the first array antenna 108, and then transmits an SRS by the second array antenna 110. If the DCI 208 is received while the countdown timer is active (has not expired) and the second array antenna 110 is in the active state, the UE 102 may reset the countdown timer. If the DCI 208 is received after expiration of the countdown timer and the second array antenna 110 is in a low-power state, the processing circuitry 104 may generate a command to transition the second array antenna 110 from the low-power state to the active state and configure the UE 102 for transmission of the SRS by the second array antenna 110 after transmission of the SRS by the first array antenna 108 and once the second array antenna 110 reaches (ramps up to) the active state.

In some embodiments, the RRC signalling 202 is received from a next-generation Node B (gNB) 201. The UE 102 may be configured to maintain a minimum guard period (Y) between transmission of the SRS 210 by the first array antenna 108 and transmission of the SRS 212 the second array antenna 110. In these embodiments, the UE 102 may be configured to maintain a minimum guard period (Y) between the transmission on two SRS resources of an SRS resource set for antenna switching. The minimum guard period may be based on the carrier frequency spacing. In some embodiments, the period between transmission of the SRS 210 by the first array antenna 108 and the transmission of the SRS 212 by the second array antenna 110 may be greater (Y') if the second array antenna 110 is in a low-power state when the DCI 208 is decoded, although the scope of the embodiments is not limited in this respect.

In some embodiments, the DCI 208 may trigger one or more SRS resource set(s) with usage parameter set to 'antenna switching'. The one or more SRS resource set(s) may be configured by the RRC signaling 202. In some embodiments, the UE 102 may transmit the SRS 210 within a first SRS resource set with the first array antenna 108 and may transmit the SRS 212 within a second SRS resource set with the second array antenna 110. In some embodiments, after decoding DCI 208, UE 102 may configure the first array antenna 108 for transmission of SRS 210 after physical uplink shared channel (PUSCH) preparation procedure time (>N2) as shown in FIGS. 2A and 2B. In some embodiments, in response to the RRC signaling 202, the UE may transmit an RRC reconfiguration complete message 206 to the gNB 201.

In some embodiments, for a UE 102 configured with one or more SRS resource configuration(s), and when the higher layer parameter resourceType in SRS-Resource is set to 'aperiodic': the UE 102 receives a configuration of SRS resource sets, and the UE 102 receives a downlink DCI, a group common DCI, or an uplink DCI based command where a codepoint of the DCI may trigger one or more SRS resource set(s). For SRS in a resource set with usage set to 'codebook' or 'antenna Switching', the minimal time interval between the last symbol of the PDCCH triggering the aperiodic SRS transmission and the first symbol of SRS resource is N2. Otherwise, the minimal time interval between the last symbol of the PDCCH triggering the aperiodic SRS transmission and the first symbol of SRS resource is N2+14. The minimal time interval in units of OFDM symbols is counted based on the minimum subcarrier spacing between the PDCCH and the aperiodic SRS.

In some embodiments, the processing circuitry 104 may configure the first array antenna 108 to remain in the active state at least while communicating with the gNB 201. The low-power state may comprise either a power-save (i.e., sleep) mode or power-off mode. In these embodiments, the processing circuitry 104 may configure the first array antenna 108 to remain in the active state whenever the UE 102 is communicating with the gNB 201. In these embodiments, the power state of the first array antenna 108 is unrelated to SRS transmission and is not switched between power states in response to DCI 208.

In some of these embodiments, use of the power-save mode may allow the second array antenna 110 to ramp up and transition to active mode more quickly. In these embodiments, in the active array antenna may comprise a variety of components including an array of power amplifiers, phase modulators and/or phase shifters, low-noise amplifiers (LNAs), and associated RF switches, among other things. In the power-off mode, most or all components are completely shut off and power consumption is quite small (almost zero). In the power-save mode, supply power may be applied to each active component, configuration information may be loaded, and the RF switches may be configured so that the array antenna is ready for transmitting.

In some embodiments, the gNB 201 may de-allocate the second array antenna 110. In these embodiments, the gNB 201 may encode RRC signalling to indicate to the UE 102 to transition the second array antenna 110 to the power-off mode, although the scope of the embodiments is not limited in this respect.

In some embodiments, the low-power state may be the power-off mode. In these embodiments if the DCI 208 is not received while the countdown timer is active, the processing circuitry 104 is to generate a command to transition the second array antenna 110 to the power-off mode upon expiration of the countdown timer. The UE 102 may also wait until another RRC signalling is received to transition the second array antenna 110 from the power-off mode to an active state. In these embodiments, the another RRC signalling may indicate antenna switching for SRS. In these embodiments, the gNB 201 may need to issue another RRC signalling to re-enable the second array antenna 110. In these embodiments, the gNB 201 may be aware that the UE 102 transitions the second array antenna 110 to the power-off mode upon expiration of the countdown timer if the DCI 208 is not received while the countdown timer is active.

In some embodiments, when the low-power state is the power-off mode, upon transitioning the second array antenna 110 to the power-off mode upon expiration of the countdown timer, the processing circuitry 104 is configured to encode signalling, via a physical uplink control channel (PUCCH), for transmission to the gNB 201 indicating that the second array antenna 110 is being transitioned to the power-off mode. In these embodiments, the UE 102 may wait until another RRC signalling is received to transition the second array antenna 110 from the power-off mode to an active state. In these embodiments, the another RRC signalling may indicate antenna switching for SRS. In these embodiments, the gNB 201 may need to issue another RRC signalling to re-enable the second array antenna 110 in response to the UE 102 indicating to the gNB 201 that that the second array antenna 110 is being transitioned to the power-off mode.

In some embodiments, when the low-power state is the power-save mode (i.e., not the power-off mode), if the DCI 208 is not received while the countdown timer is active, the processing circuitry 104 may generate a command to transition the second array antenna 110 to the power-save mode upon expiration of the countdown timer. If the DCI 208 is received while the second array antenna 110 is in the power-save mode, the processing circuitry 104 is configured to generate a command to transition the second array antenna 110 from the power-save mode to the active state. In these embodiments, since the second array antenna 110 is in the power-save mode (not the power-off mode), the second array antenna 110 can quickly transition to the active state for transmission of the SRS 212. Thus, there may be no need to notify the gNB 201 that that second antenna is in the power-save mode since additional time may not be needed by the UE 102 to activate the second array antenna 110. In these embodiments, the UE 102 may refrain from notifying the gNB 201 that that second array antenna 110 is in the power-save mode.

In some embodiments, the RRC signalling 202 may comprise an SRS-Config information element (IE) to configure the UE 102 for SRS transmission. The SRS-Config IE may indicate antenna switching for SRS and may also indicate one or more SRS resource sets to configure the UE 102 for performing a sounding procedure. In these embodiments, if the gNB 201 does not provide a continuous stream of SRS commands to keep the second array antenna 110 active within the timer window, the UE 102 may place the second array antenna 110 in the low-power state (after a time-out period) to conserve power and the gNB 201 may be forced to reissue another RRC configuration to reenable the second array antenna 110. In some embodiments, as long as the gNB 201 issue SRS commands for the second array antenna 110 during the timer window, the processing circuitry 104 may prevent the second array antenna 110 from entering the power-off mode.

In some embodiments, the IE SRS-Config is used to configure sounding reference signal transmissions. The configuration may define a list of SRS-Resources and a list of SRS-Resource Sets. Each resource set defines a set of SRS-Resources. In some embodiments, the network may trigger the transmission of the set of SRS-Resources using a configured aperiodic SRS-Resource Trigger (L1 DCI). In some embodiments, the SRS-Resource Set field descriptions include a usage parameter that indicates if the SRS resource set is used for beam management, codebook-based or non-codebook-based transmission or antenna switching.

In some embodiments, the DCI 208 may be received on a physical downlink control channel (PDCCH) from the gNB 201, and the processing circuitry 104 may be configured to encode a physical uplink shared channel (PUSCH) for transmission to the gNB 201 based on feedback from the gNB 201 210. The feedback may be based on the SRS transmissions by the UE 102. In these embodiments, the gNB 201 may measure the uplink propagation channel from the SRS transmissions. Based on this measurement and/or estimation, the gNB 201 may provide feedback to the UE 102 regarding which set of weights should be applied when transmitting the PUSCH (non-codebook-based transmission). Alternatively, the gNB 201 uses the SRS to select the antenna ports to be used for the PUSCH, and to select the appropriate Rank and precoding weights (codebook-based transmission).

Some embodiments are directed to a non-transitory computer-readable storage medium that stores instructions for execution by processing circuitry 104 of a UE 102 configured for operation in a fifth-generation system (5GS). In these embodiments, the processing circuitry 104 is configured by the instructions to initiate a countdown timer and transition the second array antenna 110 from a low-power state to an active state in response to decoding RRC signalling 202 that indicates antenna switching for SRS, and decode a DCI 208 indicating SRS antenna switching. If the DCI 208 is not received while the countdown timer is active, the processing circuitry 104 may generate a command to transition the second array antenna 110 to a low-power state upon expiration of the countdown timer. If the DCI 208 is received while the countdown timer is active (has not expired), the processing circuitry 104 may configure the UE 102 for transmission of the SRS by the second array antenna 110 and reset the countdown timer. If the DCI 208 is received after expiration of the countdown timer, the processing circuitry 104 may generate a command to transition the second array antenna 110 from the low-power state to the active state and configure the UE 102 for transmission of the SRS by the second array antenna 110.

Some embodiments are directed to an apparatus of a next-generation Node B (gNB) 201 configured for operation in a 5GS. The apparatus may comprise processing circuitry 104 and memory. In these embodiments, the gNB 201 may be configured to encode RRC signalling 202 for transmission to a UE 102. The RRC signalling 202 may indicate antenna switching for SRS transmission. The gNB 201 may also encode a DCI indicating SRS antenna switching for transmission to the UE 102. If the DCI 208 is transmitted to the UE 102 within a predetermined period of time after transmission of the RRC signalling 202 (i.e., while a countdown timer is active), the gNB 201 may decode a first SRS within a first SRS resource set transmitted by the UE 102 with a first array antenna 108, and decode a second SRS within a second SRS resource set transmitted by the UE 102 with a second array antenna 110. The second SRS may be received after minimum guard period (Y) after the first SRS. If the DCI 208 is to be transmitted to the UE 102 after the predetermined period of time, the gNB 201 may encode another RRC signalling for transmission to the UE 102. The other RRC signaling may be configured to cause the UE 102 to transition the second array antenna 110 from a power-off mode to an active state. The other RRC signalling may indicate antenna switching for SRS transmission. In some embodiments, the predetermined period of time may be based on expiration period of a countdown timer used by the UE 102 for transitioning the second array antenna 110 to the power-off mode after decoding RRC signalling 202 indicating antenna switching for SRS transmission. The gNB 201 may store a value indicative of the predetermined period of time in memory.

Referring back to FIG. 1, in some embodiments, the UE 102 may be part of a portable wireless communication device, such as a personal digital assistant (PDA), a laptop or portable computer with wireless communication capability, a web tablet, a wireless telephone, a smartphone, a wireless headset, a pager, an instant messaging device, a digital camera, an access point, a television, a medical device (e.g., a heart rate monitor, a blood pressure monitor, etc.), or other device that may receive and/or transmit information wirelessly. In some embodiments, the UE 102 may include one or more of a keyboard, a display, a non-volatile memory port, multiple antennas, a graphics processor, an application processor, speakers, and other mobile device elements. The display may be an LCD screen including a touch screen.

Although the UE 102 is illustrated as having several separate functional elements, one or more of the functional elements may be combined and may be implemented by combinations of software-configured elements, such as processing elements including digital signal processors (DSPs), and/or other hardware elements. For example, some elements may comprise one or more microprocessors, DSPs, field-programmable gate arrays (FPGAs), application specific integrated circuits (ASICs), radio-frequency integrated circuits (RFICs) and combinations of various hardware and logic circuitry for performing at least the functions described herein. In some embodiments, the functional elements may refer to one or more processes operating on one or more processing elements.

Embodiments may be implemented in one or a combination of hardware, firmware and software. Embodiments may also be implemented as instructions stored on a computer-readable storage device, which may be read and executed by at least one processor to perform the operations described herein. A computer-readable storage device may include any non-transitory mechanism for storing information in a form readable by a machine (e.g., a computer). For example, a computer-readable storage device may include read-only memory (ROM), random-access memory (RAM), magnetic disk storage media, optical storage media, flash-memory devices, and other storage devices and media. Some embodiments may include one or more processors and may be configured with instructions stored on a computer-readable storage device.

Figure 3:
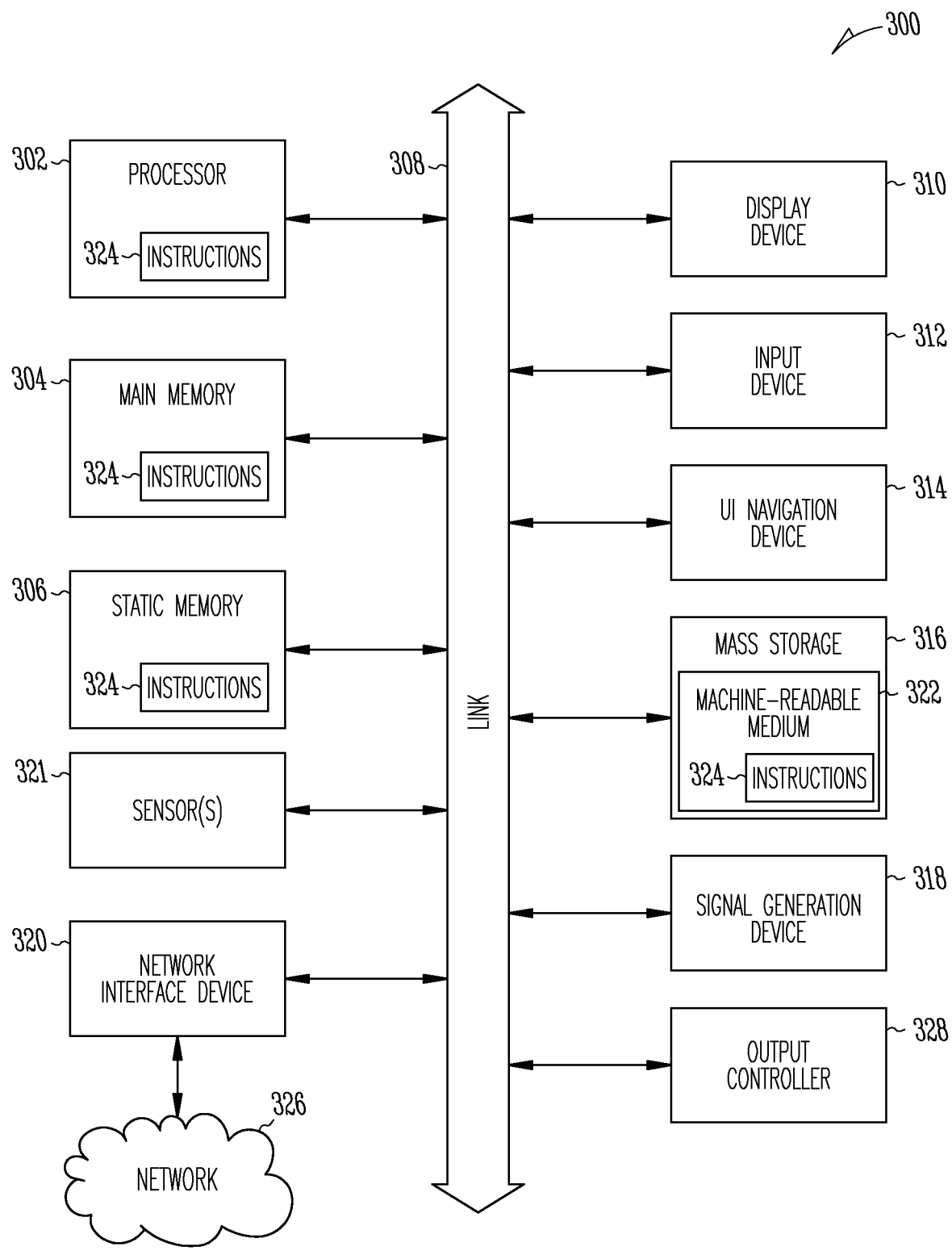
FIG. 3 illustrates a machine in accordance with some embodiments.

FIG. 3 illustrates a block diagram of an example machine 300 upon which any one or more of the techniques (e.g., methodologies) discussed herein may be performed. In alternative embodiments, the machine 300 may operate as a standalone device or may be connected (e.g., networked) to other machines. In a networked deployment, the machine 300 may operate in the capacity of a server machine, a client machine, or both in server-client network environments. In an example, the machine 300 may act as a peer machine in peer-to-peer (P2P) (or other distributed) network environment. The machine 300 may be a personal computer (PC), a tablet PC, a Personal Digital Assistant (PDA), a mobile telephone, a web appliance, or any machine capable of executing instructions (sequential or otherwise) that specify actions to be taken by that machine. In some embodiments, machine 300 may be part of a UE (such as UE 102 (FIG. 1) or part of a gNB (such as gNB 201 (FIG. 2). Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Machine (e.g., computer system) 300 may include a hardware processor 302 (e.g., a processing unit, a graphics processing unit (GPU), a hardware processor core, or any combination thereof), a main memory 304, and a static memory 306, some or all of which may communicate with each other via a link 308 (e.g., a bus, link, interconnect, or the like). The machine 300 may further include a display device 310, an input device 312 (e.g., a keyboard), and a user interface (UI) pointing device 314 (e.g., a mouse). In an example, the display device 310, input device 312, and UI pointing device 314 may be a touch screen display. The machine 300 may additionally include a mass storage (e.g., drive unit) 316, a signal generation device 318 (e.g., a speaker), a network interface device 320, and one or more sensors 321, such as a global positioning system (GPS) sensor, camera, video recorder, compass, accelerometer, or other sensor. The machine 300 may include an output controller 328, such as a serial (e.g., universal serial bus (USB), parallel, or other wired or wireless (e.g., infrared (IR)) connection to communicate or control one or more peripheral devices (e.g., a printer, card reader, etc.).

The Abstract is provided to comply with 37 C.F.R. Section 1.72(b) requiring an abstract that will allow the reader to ascertain the nature and gist of the technical disclosure. It is submitted with the understanding that it will not be used to limit or interpret the scope or meaning of the claims. The following claims are hereby incorporated into the detailed description, with each claim standing on its own as a separate embodiment.

What is claimed is:

1. An apparatus of a user equipment (UE) configured for operation in a fifth-generation system (5GS), the UE comprising first and second array antennas for transmission of mmWave signals including a sounding-reference signal (SRS), the apparatus comprising: processing circuitry; and memory, wherein the processing circuitry is configured to:
   in response to decoding radio-resource configuration (RRC) signalling that indicates antenna switching for SRS, initiate a countdown timer and transition the second array antenna from a low-power state to an active state;
   decode a downlink control information (DCI) indicating SRS antenna switching;
   if the DCI is not received while the countdown timer is active, generate a command to transition the second array antenna to a low-power state upon expiration of the countdown timer; and
   if the DCI is received while the countdown timer is active (has not expired), configure the UE for transmission of the SRS by the second array antenna and reset the countdown timer;
   if the DCI is received after expiration of the countdown timer, generate a command to transition the second array antenna from the low-power state to the active state and configure the UE for transmission of the SRS by the second active array antenna, and
   wherein the memory is configured to store the DCI.

2. The apparatus of claim 1, wherein in response to decoding the DCI, the processing circuitry is to:
   configure the UE for transmission of the SRS by the first array antenna,
   perform antenna switching to switch from the first array antenna to the second array antenna; and
   configure the UE for transmission of the SRS by the second array antenna after transmission of the SRS by the first array antenna.

3. The apparatus of claim 2, wherein the RRC signalling is received from a next-generation Node B (gNB), and
   wherein the UE is configured to maintain a minimum guard period (Y) between transmission of the SRS by the first array antenna and the second array antenna.

4. The apparatus of claim 2 wherein the processing circuitry configures the first array antenna to remain in the active state at least while communicating with the gNB, and
   wherein the low-power state comprises either a power-save (i.e., sleep) mode or power-off mode.

5. The apparatus of claim 4 wherein the low-power state is the power-off mode,
   wherein if the DCI is not received while the countdown timer is active, the processing circuitry is to generate a command to transition the second array antenna to the power-off mode upon expiration of the countdown timer, and
   wherein the processing circuitry is configured to wait until another RRC signalling is received to transition the second array antenna from the power-off mode to an active state, the another RRC signalling indicating antenna switching for SRS.

6. The apparatus of claim 4 wherein the low-power state is the power-off mode,
   wherein upon transitioning the second array antenna to the power-off mode upon expiration of the countdown timer, the processing circuitry is configured to encode signalling, via a physical uplink control channel (PUCCH), for transmission to the gNB indicating that the second array antenna is being transitioned to the power-off mode, and
   wherein the processing circuitry is configured to wait until another RRC signalling is received to transition the second array antenna from the power-off mode to an active state, the another RRC signalling indicating antenna switching for SRS.

7. The apparatus of claim 4 wherein the low-power state is the power-save mode,
wherein if the DCI is not received while the countdown timer is active, the processing circuitry is to generate a command to transition the second array antenna to the power-save mode upon expiration of the countdown timer, and
wherein if the DCI is received while the second array antenna is in the power-save mode, the processing circuitry is configured to generate a command to transition the second array antenna from the power-save mode to the active state.

8. The apparatus of claim 3 wherein the RRC signalling comprises an SRS-Config information element (IE) to configure the UE for SRS transmission, and
wherein the SRS-Config IE indicates antenna switching for SRS and further indicates one or more SRS resource sets to configure the UE for performing a sounding procedure.

9. The apparatus of claim 8, wherein the DCI is received on a physical downlink control channel (PDCCH) from the gNB, and
wherein the processing circuitry is configured to encode a physical uplink shared channel (PUSCH) for transmission to the gNB based on feedback from the gNB, the feedback based on the SRS transmissions by the UE.

10. The apparatus of claim 1, wherein the processing circuitry comprises a baseband processor, and wherein the apparatus further comprises the countdown timer.

11. A non-transitory computer-readable storage medium that stores instructions for execution by processing circuitry of a user equipment (UE) configured for operation in a fifth-generation system (5GS), the UE comprising first and second array antennas for transmission of mmWave signals including a sounding-reference signal (SRS), the processing circuitry configured by the instructions to:
in response to decoding radio-resource configuration (RRC) signalling that indicates antenna switching for SRS, initiate a countdown timer and transition the second array antenna from a low-power state to an active state;
decode a downlink control information (DCI) indicating SRS antenna switching;
if the DCI is not received while the countdown timer is active, generate a command to transition the second array antenna to a low-power state upon expiration of the countdown timer; and
if the DCI is received while the countdown timer is active (has not expired), configure the UE for transmission of the SRS by the second array antenna and reset the countdown timer;
if the DCI is received after expiration of the countdown timer, generate a command to transition the second array antenna from the low-power state to the active state and configure the UE for transmission of the SRS by the second active array antenna.

12. The non-transitory computer-readable storage medium of claim 11, wherein in response to decoding the DCI, the processing circuitry is to:
configure the UE for transmission of the SRS by the first array antenna,
perform antenna switching to switch from the first array antenna to the second array antenna; and
configure the UE for transmission of the SRS by the second array antenna after transmission of the SRS by the first array antenna.

13. The non-transitory computer-readable storage medium of claim 12, wherein the RRC signalling is received from a next-generation Node B (gNB), and
wherein the UE is configured to maintain a minimum guard period (Y) between transmission of the SRS by the first array antenna and the second array antenna.

14. The non-transitory computer-readable storage medium of claim 12 wherein the processing circuitry configures the first array antenna to remain in the active state at least while communicating with the gNB, and
wherein the low-power state comprises either a power-save (i.e., sleep) mode or power-off mode.

15. The non-transitory computer-readable storage medium of claim 14 wherein the low-power state is the power-off mode,
wherein if the DCI is not received while the countdown timer is active, the processing circuitry is to generate a command to transition the second array antenna to the power-off mode upon expiration of the countdown timer, and
wherein the processing circuitry is configured to wait until another RRC signalling is received to transition the second array antenna from the power-off mode to an active state, the another RRC signalling indicating antenna switching for SRS.

16. The non-transitory computer-readable storage medium of claim 14 wherein the low-power state is the power-off mode,
wherein upon transitioning the second array antenna to the power-off mode upon expiration of the countdown timer, the processing circuitry is configured to encode signalling, via a PUCCH, for transmission to the gNB indicating that the second array antenna is being transitioned to the power-off mode, and
wherein the processing circuitry is configured to wait until another RRC signalling is received to transition the second array antenna from the power-off mode to an active state, the another RRC signalling indicating antenna switching for SRS.

17. The non-transitory computer-readable storage medium of claim 14 wherein the low-power state is the power-save mode,
wherein if the DCI is not received while the countdown timer is active, the processing circuitry is to generate a command to transition the second array antenna to the power-save mode upon expiration of the countdown timer, and
wherein if the DCI is received while the second array antenna is in the power-save mode, the processing circuitry is configured to generate a command to transition the second array antenna from the power-save mode to the active state.

18. The non-transitory computer-readable storage medium of claim 13 wherein the RRC signalling comprises an SRS-Config information element (IE) to configure the UE for SRS transmission, and
wherein the SRS-Config IE indicates antenna switching for SRS and further indicates one or more SRS resource sets to configure the UE for performing a sounding procedure.

19. An apparatus of a next-generation Node B (gNB) configured for operation in a fifth-generation system (5GS), the apparatus comprising: processing circuitry; and memory, wherein the processing circuitry is configured to:

encode radio-resource configuration (RRC) signalling for transmission to a user equipment (UE), the RRC signalling indicating antenna switching for sounding-reference signal (SRS) transmission;

encode a downlink control information (DCI) indicating SRS antenna switching for transmission to the UE, wherein if the DCI is transmitted to the UE within a predetermined period of time after transmission of the RRC signalling, the processing circuitry is configured to decode a first SRS within a first SRS resource set transmitted by the UE with a first array antenna, and decode a second SRS within a second SRS resource set transmitted by the UE with a second array antenna, the second SRS being received after minimum guard period (Y) after the first SRS, and wherein if the DCI is to be transmitted to the UE after the predetermined period of time, the processing circuitry is configured to encode another RRC signalling for transmission to the UE, the another RRC signaling to cause the UE to transition the second array antenna from a power-off mode to an active state, the another RRC signalling indicating antenna switching for SRS transmission.

20. The apparatus of claim 19, wherein the predetermined period of time is based on expiration period of a countdown timer used by the UE for transitioning the second array antenna to the power-off mode after decoding RRC signalling indicating antenna switching for SRS transmission, and wherein the memory is configured to store a value indicative of the predetermined period of time.

\* \* \* \* \*